United States Patent Office 2,807,364
Patented Sept. 24, 1957

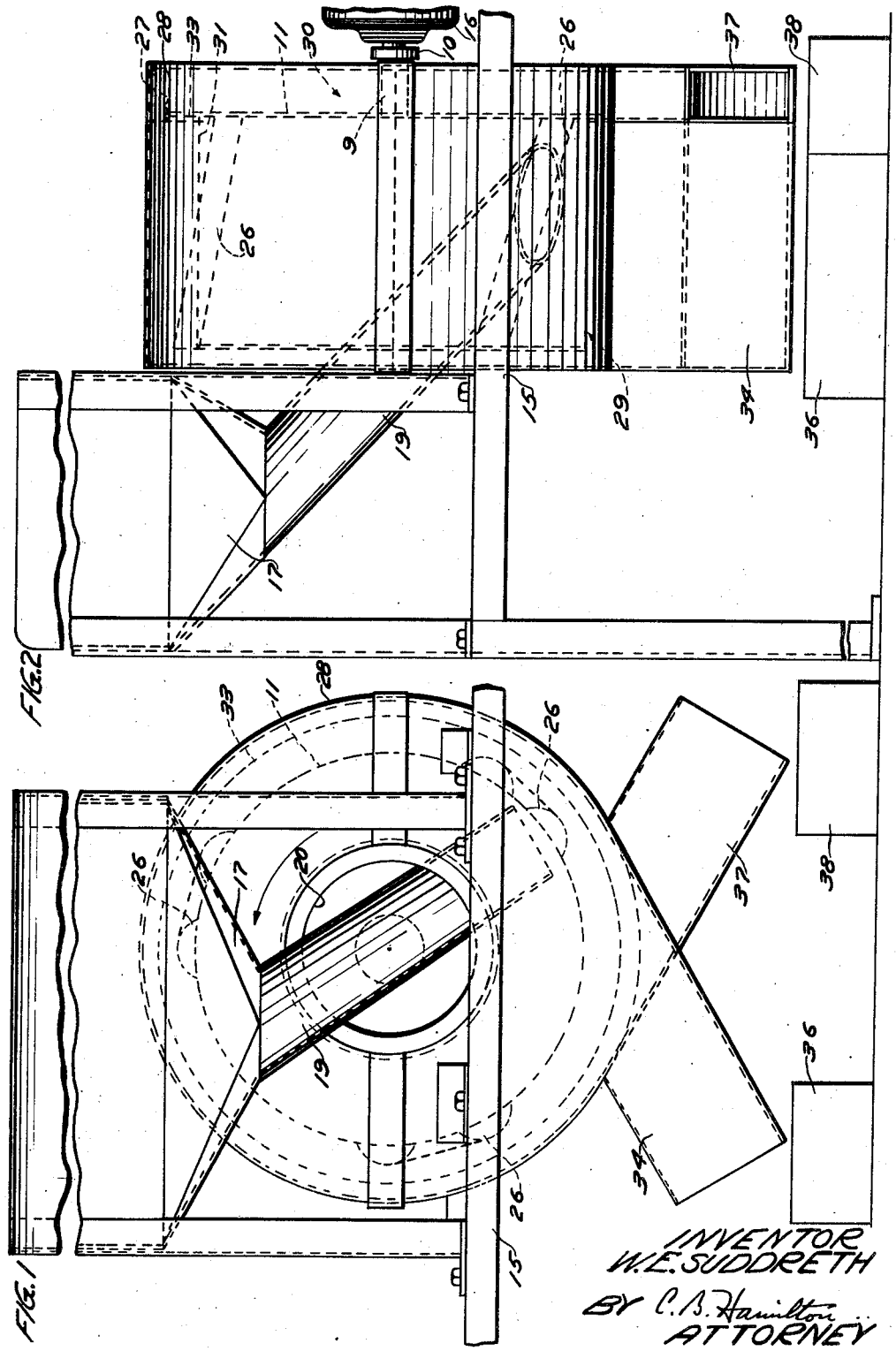

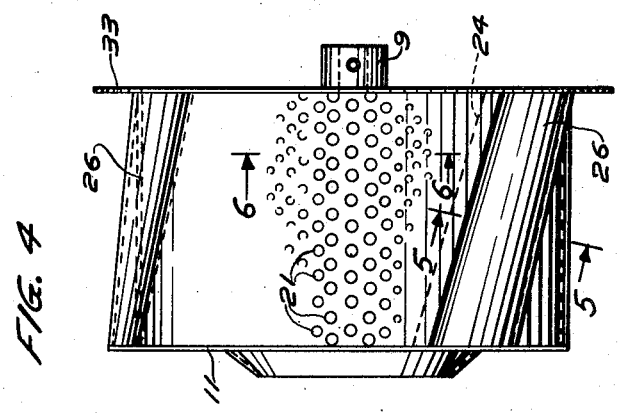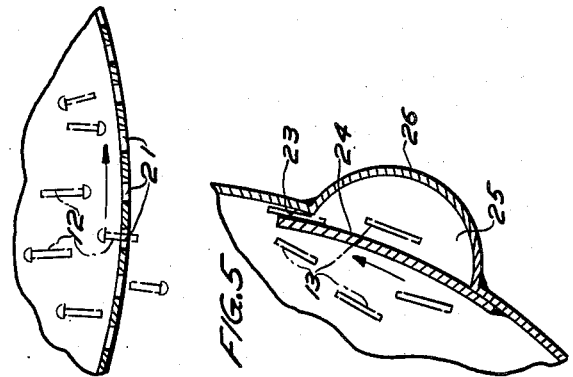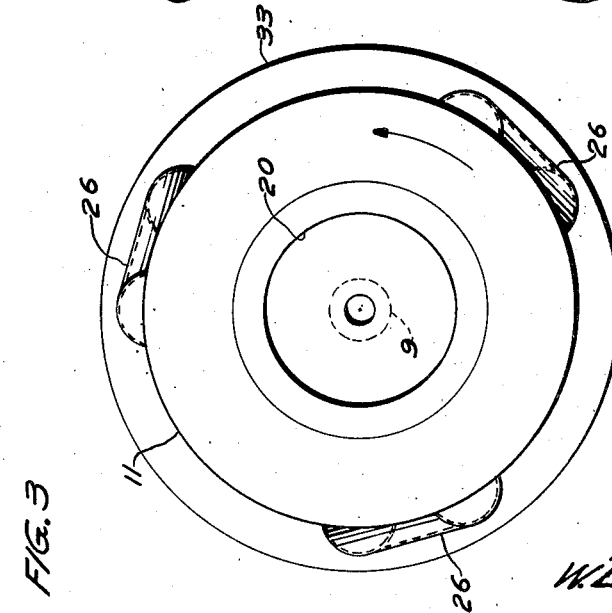

2,807,364

SORTING DEVICES

Walter E. Suddreth, Greenfield, Ind., assignor to Western Electric Company, Incorporated, New York, N. Y., a corporation of New York Application July 14, 1955, Serial No. 522,047

7 Claims. (Cl. 209—75)

This invention relates to sorting devices and more particularly to devices for separating screws and washers.

An object of this invention is to provide a sorting device including a rotating drum having slots and holes through which washers and screws pass into respective receptacles.

One embodiment of the present invention may include a hopper for feeding screws and washers into a rotating drum having peripheral holes through which only the screws can pass and slots through which only the washers can pass. The washers pass through the slots and are carried by peripheral passages on the drum to a chute at one end of the drum whereupon they fall into a receptacle. A shell enclosing the drum collects the screws as they fall through the holes in the drum and permits them to fall into another receptacle.

Other objects and advantages of the invention will become apparent by reference to the following detailed description thereof and the accompanying drawings illustrating a preferred embodiment of the invention, in which:

Fig. 1 is a front view of the device;

Fig. 2 is a side view of the device showing the tubular portion of the hopper extended into the drum;

Fig. 3 is an end view of the drum showing the opening through which the screws and washers are deposited in the drum;

Fig. 4 is a side view of the drum showing the apertures through which the screws pass and the channels which receive the washers after they pass through the slots;

Fig. 5 is an enlarged fragmentary view taken on line 5—5 of Fig. 4 showing the manner in which the washers pass from the drum through the slots into the channels; and Fig. 6 is an enlarged fragmentary view taken on line 6—6 of Fig. 4 showing the manner in which the screws pass through the apertures in the drum.

Referring now in detail to the drawings, a rotatable drum 11 supported on a shaft 10 fitting into a boss 9 serves to receive a mass of screws 12 and washers 13 to separate them, and is shown mounted on a base 15 (Figs. 1 and 2) and driven by a motor 16. A feed hopper 17 mounted at one end of the drum 11 is provided with a depending tubular portion 19, which extends into the drum 11 through a central opening 20 therein, whereby screws and washers deposited in the hopper 17 will be fed into the drum 11 for the separating operation. The periphery of the drum 11 is provided with a plurality of apertures 21, which are adapted to pass only the screws 12 when the mass of screws and washers is agitated by rotation of the drum 11, these apertures 21 being too small to pass the washers 13.

The drum 11 is also provided with a plurality of peripheral slots 23 (Fig. 5), which are formed by plates 24 and the inner periphery of the drum. The slots are adapted to receive the washers 13 edgewise as they slide along the side of the rotating drum 11, the screws 12 being greater in each dimension than the width of the slots so that the screws cannot enter the slots. The washers 13 pass through the slots 23 into channels 25 formed by hollow members 26 secured to the drum 11. These slots 23 and hollow members 26 are skewed on the periphery of the drum 11, whereby the washers 13 move through the channels 26 to the right hand end, as viewed in Fig. 4, of the drum 11 as it is rotated. The channels are closed on the left hand ends thereof, and are open on the right hand ends to discharge the washers 13 through their open ends as the drum is rotated.

A housing 28 supported by the base 15 is divided by a partition 27 (Fig. 2) into a large compartment 29 for receiving screws 12 and a small compartment 30 for receiving washers 13 discharged through the open ends of the channels 25. The drum 11 is positioned in the large compartment 29 with its right hand end, as viewed in Fig. 2 extending slightly into the small compartment 30 through a hole 31 in the partition 27, whereby screws 12 discharged from the drum 11 through the apertures 21 fall into the large compartment 29 and washers 13 discharged from the channels 25 fall into the small compartment 30. The right hand end of the drum 11 is provided with a peripheral flange 33, which is adjacent to the partition 27 and of a larger diameter than the hole 31 in the partition 27 to insure that stray washers or screws do not pass through the hole 31 into the wrong compartment. The screws 12 which fall into the large compartment 29 are carried by a downwardly extending chute 34 of the housing 28 which is open at its lower end to permit the screws 12 to drop into a container 36. A chute 37 carries washers 13 from the small compartment 30 downward into a second container 38.

In operation, a mixture of screws 12 and washers 13 is poured into the hopper 17 and is carried through the tubular portion 19 into the rotating drum 11. The screws 12 and washers 13 fall and slide along the periphery of the drum 11 as it is rotated. The falling screws 12 pass through the apertures 21 into the large compartment 29, which carries them into the container 36. The washers 13 enter the channels 25 through the slots 23 as shown in Fig. 5. The channels 25 carry the washers 13 into the small compartment 30 whereupon the chute 37 directs them into the second container 38.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. A device for separating washers from thicker parts, comprising a member for supporting the washers and parts, said member having a plurality of slots through which only the washers can pass, means for creating relative movement between the member and the washers and parts, whereby the washers placed therein will pass through the slots, said slots facing generally in the direction of movement relative to the washers, and a plurality of hollow elements secured to the member beneath the slots for receiving the washers as they drop through said slots, said member also having between the hollow elements a plurality of apertures through which only the thicker parts can pass.

2. A device for separating screws and washers, comprising a hollow rotating member, means for feeding a mixture of washers and screws into the hollow member, said hollow member having a plurality of apertures through which only the screws fall as the hollow member is rotated, means for collecting said falling screws, said hollow member having a plurality of peripheral slots facing generally in the direction of rotation and through which only the washers pass as the hollow member is rotated, a plurality of hollow elements secured to the hollow member to receive the washers as they pass through the slots, each said hollow element having an opening therein, and means having an opening in register with the openings in the hollow elements for collecting the washers from the hollow elements.

3. A device for separating screws and washers, comprising a rotatable drum having apertures through which only screws can pass and slots through which only washers can pass when a mass of screws and washers are placed in the rotating drum, said slots facing generally in the direction of rotation of the drum, means for rotating the drum to agitate said mass of screws and washers, means for collecting the screws which pass through the apertures, a plurality of hollow elements secured to the periphery of the drum for receiving the washers which pass through the slots, said hollow elements each having an opening therein, and means having an opening connected to the openings in the hollow elements for collecting the washers from the hollow elements.

4. A device for separating screws and washers, comprising a rotatable drum having a plurality of apertures through which only screws can pass and a plurality of slots through which only washers can pass, means for rotating the drum to agitate a mass of screws and washers placed therein whereby the screws pass through the apertures and the washers pass through the slots, a plurality of hollow elements secured to the periphery of the drum for receiving the washers which pass through said slots, and a housing enclosing the drum and having a compartment for receiving the screws and a compartment for receiving the washers, said hollow elements each having an opening connected to the washer receiving compartment.

5. A device for separating screws and washers, comprising a rotatable drum for receiving a mixture of screws and washers and having a plurality of peripheral apertures through which only the screws can pass and a plurality of peripheral slots through which the washers can pass, said screws being larger in each dimension than the slots whereby only washers can pass through said slots, a hopper for feeding said mixture of screws and washers into the drum, means for rotating the drum to agitate said mixture whereby the screws pass through the apertures and the washers pass through the slots, said drum having a plurality of hollow elements on its periphery for receiving the washers which pass through the slots and for carrying them to one end of the drum as it is rotated, the end of each said hollow element each being open at said one end of the drum, means for collecting the screws, and means covering said one end of the drum for collecting the washers as they leave the hollow elements through the open ends thereof.

6. A device for separating screws and washers, comprising a rotatable drum having a plurality of peripheral troughs extending outwardly, means for rotating the drum to agitate a mixture of screws and washers placed therein, said drum having a plurality of peripheral apertures between the troughs through which only the screws can pass, and a plurality of plates secured at one edge to the inner surface of the drum at the edges of the plurality of troughs and extending across them in the direction of rotation of the drum to cover them, said plates being spaced from the drum at the edges opposite said secured edges to form slots through which washers sliding along the inner surface of the drum will pass into the troughs, said screws being larger in each dimension than the width of said slots whereby only washers will pass through the slots.

7. A device for separating screws and washers, comprising a rotatable cylindrical drum having therein a plurality of helically positioned slots through which only the washers can pass, a plurality of helical hollow elements secured to the drum and covering the helical slots for collecting washers which pass through said slots, said hollow elements being open at one end of the drum, collection means positioned at said one end of the drum and having an opening aligned with the open ends of the hollow elements, means for rotating the drum whereby the washers pass through the slots and the hollow elements into the collection means, said drum also having between the hollow elements a plurality of apertures through which only the screws can pass, and a housing enclosing the drum for receiving screws which pass through said apertures.

References Cited in the file of this patent

UNITED STATES PATENTS

| | | |
|---|---|---|
| 854,443 | Voorhees et al. | May 21, 1907 |
| 1,831,918 | Knight | Nov. 17, 1931 |
| 2,316,986 | Parker | Apr. 20, 1943 |
| 2,427,410 | Krasa | Sept. 16, 1947 |
| 2,699,868 | Bailey et al. | Jan. 18, 1955 |